(12) United States Patent
Oguro (10) Patent No.: US 11,654,892 B2
(45) Date of Patent: May 23, 2023

(54) CONTROL APPARATUS

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/126,779

(22) Filed: Dec. 18, 2020

(65) Prior Publication Data

US 2021/0253088 A1 Aug. 19, 2021

(30) Foreign Application Priority Data

Feb. 19, 2020 (JP) .............................. JP2020-025792

(51) Int. Cl.
| | | |
|---|---|---|
| *B60W 30/02* | (2012.01) | |
| *B60W 40/10* | (2012.01) | |
| *B60W 30/18* | (2012.01) | |
| *B60W 40/068* | (2012.01) | |
| *B60W 10/119* | (2012.01) | |

(52) U.S. Cl.
CPC .......... *B60W 30/02* (2013.01); *B60W 10/119* (2013.01); *B60W 30/18172* (2013.01); *B60W 40/068* (2013.01); *B60W 40/10* (2013.01); *B60W 2520/263* (2013.01)

(58) Field of Classification Search
CPC ............... B60W 30/02; B60W 10/119; B60W 30/18172; B60W 40/068; B60W 40/10; B60W 2520/263; B60W 2520/26; B60W 2552/40; B60W 2720/403; B60K 17/354; Y02T 10/72
See application file for complete search history.

(56) References Cited

U.S. PATENT DOCUMENTS

| | | | | |
|---|---|---|---|---|
| 2003/0036837 A1* | 2/2003 | Katayama | ............... | F16D 48/06 701/69 |
| 2007/0038340 A1* | 2/2007 | Sekiguchi | ............... | B60L 50/60 701/22 |
| 2013/0261864 A1* | 10/2013 | Noguchi | ............. | B60L 15/2072 701/22 |
| 2014/0228167 A1* | 8/2014 | Frank | ..................... | B60K 6/442 180/65.265 |

(Continued)

FOREIGN PATENT DOCUMENTS

| | | | | |
|---|---|---|---|---|
| DE | 10049567 A1 * | 10/2001 | ........... | B60K 17/354 |
| JP | 2000013922 A * | 1/2000 | ............ | B60L 15/007 |

(Continued)

OTHER PUBLICATIONS

DE-10049567-A1 translation (Year: 2001).*
JP-3832499-B2 translation (Year: 2006).*
JP-2000013922-A translation (Year: 2000).*

*Primary Examiner* — Jeff A Burke
*Assistant Examiner* — Kyle T Johnson
(74) *Attorney, Agent, or Firm* — McGinn I.P. Law Group, PLLC.

(57) ABSTRACT

A control apparatus includes a controller. Upon a slip of a front wheel of a vehicle, the controller executes torque adjustment control that reduces a driving torque of the front wheel of the vehicle and adjusts a driving torque of a rear wheel of the vehicle to equal to or less than the driving torque of the front wheel.

20 Claims, 5 Drawing Sheets

(56) References Cited

U.S. PATENT DOCUMENTS

| | | | | |
|---|---|---|---|---|
| 2016/0229291 A1* | 8/2016 | Mao | ................... | B60K 23/0808 |
| 2017/0282928 A1* | 10/2017 | Sakaguchi | ............ | B60W 10/08 |
| 2019/0104675 A1* | 4/2019 | Shinkai | ................ | A01B 63/112 |
| 2021/0253088 A1* | 8/2021 | Oguro | ................... | B60W 10/119 |
| 2021/0253101 A1* | 8/2021 | Nahrwold | .............. | B62D 6/007 |

FOREIGN PATENT DOCUMENTS

| | | | | |
|---|---|---|---|---|
| JP | 3832499 B2 * | 10/2006 | ............. | B60K 17/34 |
| JP | JP 2007-314099 A | 12/2007 | | |

* cited by examiner

CONTROL APPARATUS

CROSS-REFERENCE TO RELATED APPLICATIONS

The present application claims priority from Japanese Patent Application No. 2020-025792 filed on Feb. 19, 2020, the entire contents of which are hereby incorporated by reference.

BACKGROUND

The technology relates to a control apparatus.

A technique has been proposed to control front-wheel driving torque and rear-wheel driving torque of a vehicle in a separate manner. For example, Japanese Unexamined Patent Application Publication No. 2007-314099 discloses a technique of controlling front-wheel driving torque and rear-wheel driving torque in a separate manner by using at least one of an engine or a front motor as a drive source of the front wheels, and a rear motor as a drive source of the rear wheels.

SUMMARY

An aspect of the technology provides a control apparatus including a controller. Upon a slip of a front wheel of a vehicle, the controller is configured to execute torque adjustment control that reduces a driving torque of the front wheel of the vehicle and adjusts a driving torque of a rear wheel of the vehicle to equal to or less than the driving torque of the front wheel.

An aspect of the technology provides a control apparatus including circuitry. Upon a slip of a front wheel of a vehicle, the circuitry is configured to execute torque adjustment control that reduces a driving torque of the front wheel of the vehicle and adjusts a driving torque of a rear wheel of the vehicle to equal to or less than the driving torque of the front wheel.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

A vehicle that controls front-wheel driving torque and rear-wheel driving torque in a separate manner can cause a slip of the front wheels when entering a low μ road, such as a frozen traveling road. In such a case, the vehicle executes control that reduces the front-wheel driving torque and compensates for the reduction in the front-wheel driving torque by generating rear-wheel driving torque in an amount substantially the same as the amount of reduction in the front-wheel driving torque. This maintains total torque to be generated in the vehicle and cancels the slip of the front wheels. However, increasing the rear-wheel driving torque can cause a slip of the rear wheels, leading to an unstable behavior, such as an oversteer behavior, of the vehicle.

It is desirable to provide a control apparatus that stabilizes a vehicle behavior.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. Illustration of components not directly relevant to the technology is omitted.

[Example Configuration of Vehicle]

An example configuration of a vehicle 1 on which a control apparatus 100 according to an example embodiment of the technology is mounted will now be described with reference to FIGS. 1 and 2.

Figure 1:
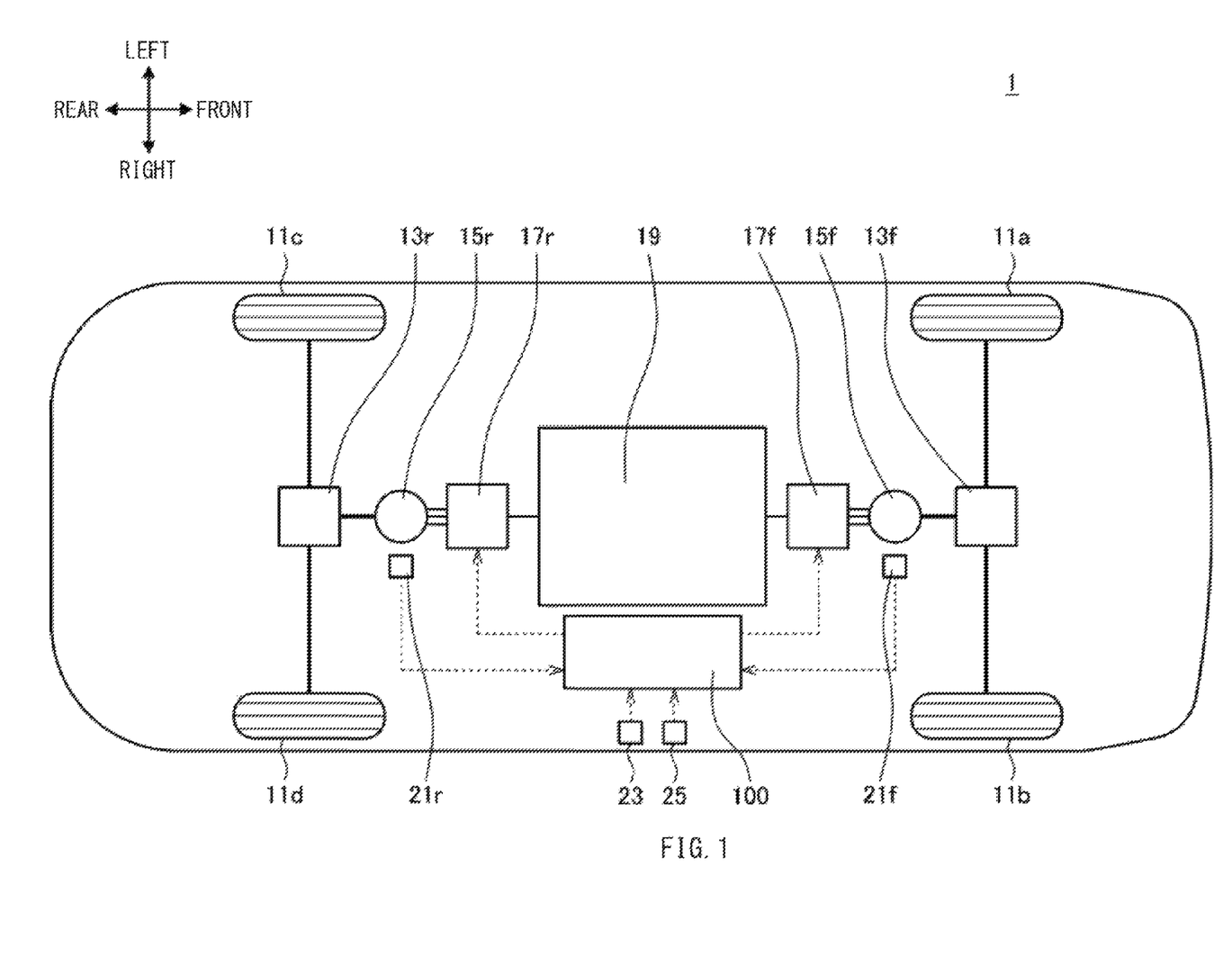
FIG. 1 is a schematic diagram illustrating an example configuration of a vehicle on which a control apparatus according to one example embodiment of the technology is mounted.

FIG. 1 schematically illustrates the example configuration of the vehicle 1. In FIG. 1, a front direction is a direction in which the vehicle 1 advances forward, a rear direction is a direction opposite to the front direction, and a right direction and left direction are defined with respect to the vehicle 1 directed in the front direction.

The vehicle 1 may be an electric vehicle including drive motors as drive sources. For example, the vehicle 1 may include a front-wheel drive motor 15f and a rear-wheel drive motor 15r that are described below. The vehicle 1 may travel using the torque outputted from these drive motors.

Note that the vehicle 1 described herein is a mere example of the vehicle on which the control apparatus according to the example embodiment of the technology is mounted. As described below, the configuration of the vehicle on which the control apparatus according to the example embodiment of the technology is mounted should not be limited to the configuration of the vehicle 1.

With reference to FIG. 1, the vehicle 1 may include front wheels 11a and 11b, rear wheels 11c and 11d, a front differential unit 13f, a rear differential unit 13r, a front-wheel drive motor 15f, a rear-wheel drive motor 15r, inverters 17f and 17r, a battery 19, a front-wheel motor revolution sensor 21f, a rear-wheel motor revolution sensor 21r, a vehicle speed sensor 23, an accelerator operation sensor 25, and the control apparatus 100.

Hereinafter, the front wheels 11a and 11b and the rear wheels 11c and 11d may also be referred to as a drive wheel 11 when there is no need to distinguish them. The front-wheel drive motor 15f and the rear-wheel drive motor 15r may also be referred to as a drive motor 15 when there is no need to distinguish them. The inverters 17f and 17r may also be referred to as an inverter 17 when there is no need to distinguish them. The front-wheel motor revolution sensor 21f and the rear-wheel motor revolution sensor 21r may also be referred to as a motor revolution sensor 21 when there is no need to distinguish them.

The front-wheel drive motor 15f may output torque to drive the front wheels 11a and 11b (i.e., output driving torque of the front wheels 11a and 11b). The front wheel 11a may correspond to a left front wheel, and the front wheel 11b may correspond to a right front wheel.

The front-wheel drive motor 15f may be driven by electric power supplied from the battery 19. The front-wheel drive motor 15f may be coupled to the front differential unit 13f. The front differential unit 13f may be coupled to the front wheels 11a and 11b via a drive shaft. The torque outputted from the front-wheel drive motor 15f may be transmitted to the front differential unit 13f, and then distributed by the front differential unit 13f to the front wheels 11a and 11b.

The front-wheel drive motor 15f may be a polyphase alternating current (AC) motor, for example. The front-wheel drive motor 15f may be coupled to the battery 19 via the inverter 17f. Direct current (DC) power supplied from the battery 19 may be converted into AC power by the inverter 17f, and the AC power may be supplied to the front-wheel drive motor 15f.

The front-wheel drive motor 15f may not only output the driving torque of the front wheels 11a and 11b but also serve as a power generator that generates electric power using the kinetic energy of the front wheels 11a and 11b. In the case of the front-wheel drive motor 15f serving as a power generator, electric power may be generated by the front-wheel drive motor 15f, and a braking force generated by regenerative braking may be imparted to the vehicle 1. The AC power generated by the front-wheel drive motor 15f may be converted by the inverter 17f into DC power, and the DC power may be supplied to the battery 19. The battery 19 may be charged with the DC power.

The rear-wheel drive motor 15r may output torque to drive the rear wheels 11c and 11d (i.e., output driving torque of the rear wheels 11c and 11d). The rear wheel 11c may correspond to a left rear wheel, and the rear wheel 11d may correspond to a right front wheel.

The rear-wheel drive motor 15r may be driven by electric power supplied from the battery 19. The rear-wheel drive motor 15r may be coupled to the rear differential unit 13r. The rear differential unit 13r may be coupled to the rear wheels 11c and 11d via a drive shaft. The torque outputted from the rear-wheel drive motor 15r may be transmitted to the rear differential unit 13r, and then distributed by the rear differential unit 13r to the rear wheels 11c and 11d.

The rear-wheel drive motor 15r may be a polyphase AC motor, for example. The rear-wheel drive motor 15r may be coupled to the battery 19 via the inverter 17r. DC power supplied from the battery 19 may be converted into AC power by the inverter 17r, and the AC power may be supplied to the rear-wheel drive motor 15r.

The rear-wheel drive motor 15r may not only output the driving torque of the rear wheels 11c and 11d but also serve as a power generator that generates electric power using the kinetic energy of the rear wheels 11c and 11d. In the case of the rear-wheel drive motor 15r serving as a power generator, electric power may be generated by the rear-wheel drive motor 15r, and a braking force generated by regenerative braking may be imparted to the vehicle 1. The AC power generated by the rear-wheel drive motor 15r may be converted by the inverter 17r into DC power, and the DC power may be supplied to the battery 19. The battery 19 may be charged with the DC power.

The front-wheel motor revolution sensor 21f may detect the number of revolutions of the front-wheel drive motor 15f, and output the result of the detection. The number of revolutions of the front-wheel drive motor 15f detected by the front-wheel motor revolution sensor 21f may be used as data indicative of the wheel speed of the front wheels 11a and 11b in a process executed by the control apparatus 100 described below.

The rear-wheel motor revolution sensor 21r may detect the number of revolutions of the rear-wheel drive motor 15r, and output the result of the detection. The number of revolutions of the rear-wheel drive motor 15r detected by the rear-wheel motor revolution sensor 21r may be used as data indicative of the wheel speed of the rear wheels 11c and 11d in the process executed by the control apparatus 100 described below.

The vehicle speed sensor 23 may detect a speed of the vehicle 1 (i.e., a vehicle speed), and output the result of the detection.

The accelerator operation sensor 25 may detect the amount of accelerating operation performed by a driver (e.g., the depressing amount of a non-illustrated accelerator pedal) and output the result of the detection.

The control apparatus 100 may include a central processing unit (CPU) performing arithmetic processing, and memory devices, such as a read only memory (ROM) storing programs and calculation parameters to be used by the CPU and a random access memory (RAM) temporarily storing parameters that change as appropriate when the CPU executes programs, for example.

The control apparatus 100 may communicate with components in the vehicle 1 including the inverters 17, the front-wheel motor revolution sensor 21f, the rear-wheel motor revolution sensor 21r, the vehicle speed sensor 23, and the accelerator operation sensor 25, for example. The communication between the control apparatus 100 and each of the components may be established by a controller area network (CAN) communication, for example.

Alternatively, the function of the control apparatus 100 according to the example embodiment may be distributed to a plurality of control apparatuses. Still alternatively, the single control apparatus 100 may achieve a plurality of functions. In a case where the function of the control apparatus 100 is distributed to a plurality of control apparatuses, the plurality of control apparatuses may be coupled to each other via a communication bus such as a CAN.

Figure 2:
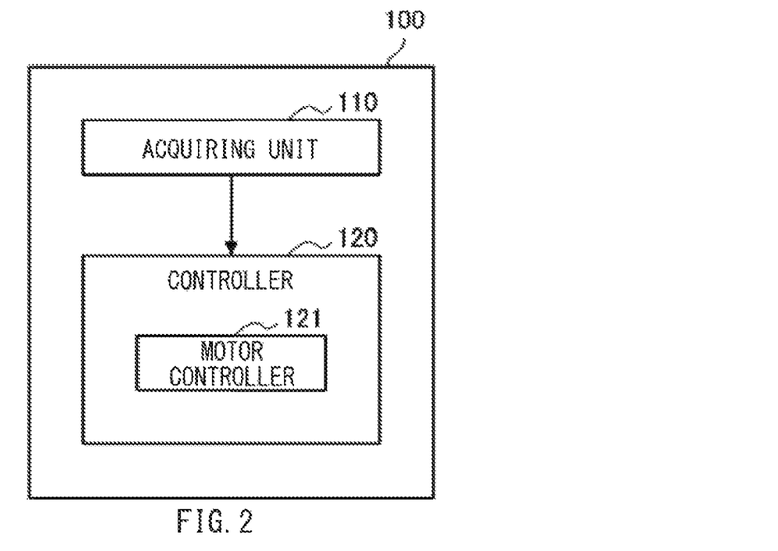
FIG. 2 is a block diagram illustrating an example configuration of the control apparatus according to the example embodiment of the technology.

FIG. 2 is a block diagram illustrating an example configuration of the control apparatus 100.

As illustrated in FIG. 2, the control apparatus 100 may include a acquiring unit 110 and a controller 120, for example.

The acquiring unit 110 may acquire various pieces of data to be used in a process executed by the controller 120, and output the acquired data to the controller 120. For example, the acquiring unit 110 may acquire various pieces of data from the front-wheel motor revolution sensor 21f, the rear-wheel motor revolution sensor 21r, the vehicle speed sensor 23, and the accelerator operation sensor 25.

The controller 120 may control the travel of the vehicle 1 by controlling an operation of each of the components in the vehicle 1. For example, the controller 120 may include a motor controller 121.

The motor controller 121 may control an operation of each of the drive motors 15 by controlling an operation of each of the inverters 17. For example, the motor controller 121 may control electric power supply between the battery 19 and the front-wheel drive motor 15f by controlling an operation of a switching element in the inverter 17f. The driving torque of the front wheels 11a and 11b to be outputted from the front-wheel drive motor 15f may be thereby controlled. Further, the motor controller 121 may control electric power supply between the battery 19 and the rear-wheel drive motor 15r by controlling an operation of a switching element in the inverter 17r. The driving torque of the rear wheels 11c and 11d to be outputted from the rear-wheel drive motor 15r may be thereby controlled. As described above, the motor controller 121 may control the driving torque of the front wheels 11a and 11b and the driving torque of the rear wheels 11c and 11d in a separate manner.

The controller 120 may be configured to switch the drive mode of the vehicle 1 between a front-wheel drive mode and a four-wheel drive mode. In the front-wheel drive mode, the front wheels 11a and 11b are driven whereas the rear wheels 11c and 11d are not driven. In the four-wheel drive mode, the front wheels 11a and 11b and the rear wheels 11c and 11d are driven. In one embodiment, the front-wheel drive mode may serve as a "first drive mode". In one embodiment, the four-wheel drive mode may serve as a "second drive mode".

In normal driving (e.g., while the vehicle 1 is traveling without causing a slip of any of the drive wheels 11), the controller 120 may switch the drive mode to the front-wheel drive mode. In the front-wheel drive mode, the number of components to be operated to transmit torque within the vehicle 1 may be less than that in the four-wheel drive mode. This helps to reduce electric power consumption.

In contrast, upon a slip of the front wheels 11a and 11b, the controller 120 may switch the drive mode to the four-wheel drive mode. The term "slip" used herein may refer to a phenomenon in which the slip ratio of any of the drive wheels 11 (e.g., a value obtained by dividing the difference between the wheel speed and the vehicle speed by the vehicle speed) becomes so large that the drive wheel 11 runs idle. The slip may be caused when the vehicle 1 enters a low μ road, for example. The low μ road may be a road having a friction coefficient equal to or less than a reference friction coefficient. For example, the low μ road may be a traveling road on which the drive wheels 11 are highly likely to slip (e.g., a frozen traveling road).

According to this example embodiment, in a case where the drive mode is switched to the four-wheel drive mode upon a slip of the front wheels 11a and 11b, the controller 120 in the control apparatus 100 performs torque adjustment control that reduces the driving torque of the front wheels 11a and 11b and adjusts the driving torque of the rear wheels 11c and 11d to equal to or less than the driving torque of the front wheels 11a and 11b. The torque adjustment control stabilizes the vehicle behavior. The process executed by the control apparatus 100 to stabilize the vehicle behavior is described in detail below.

[Example Operation of Control Apparatus]

An operation of the control apparatus 100 according to an example embodiment of the technology will now be described with reference to FIGS. 3 to 6.

Figure 3:
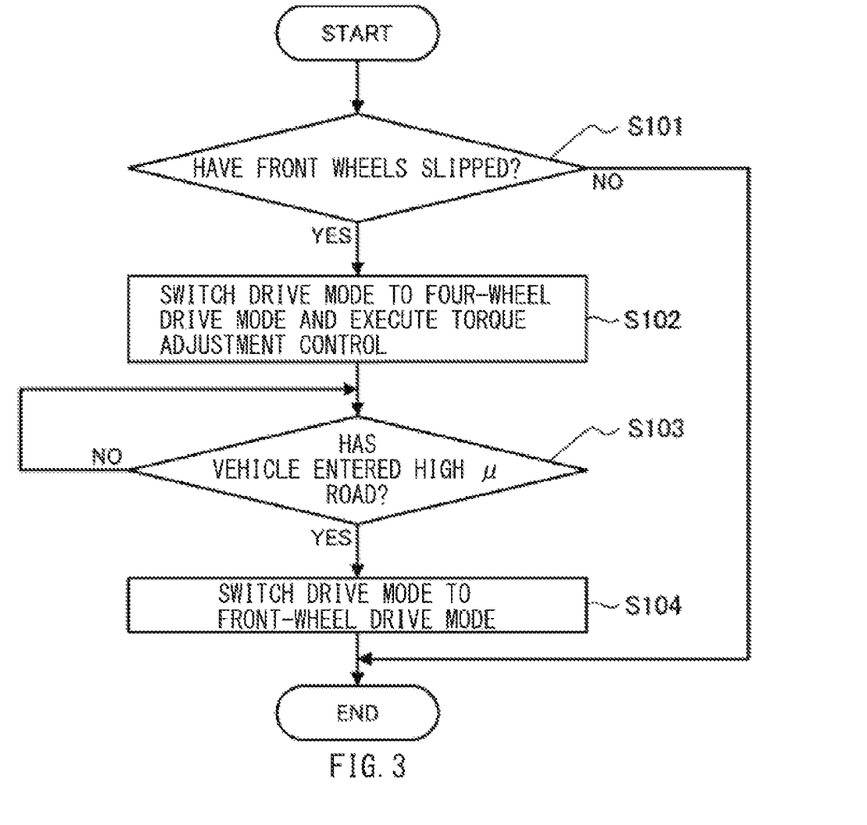
FIG. 3 is a flowchart illustrating an example process executed by the control apparatus according to the example embodiment of the technology to stabilize a vehicle behavior.

FIG. 3 is a flowchart illustrating an example process executed by the control apparatus 100 to stabilize the vehicle behavior. The control flow illustrated in FIG. 3 may be repeatedly executed by the controller 120, for example. The control flow illustrated in FIG. 3 may start in a condition where the drive mode of the vehicle 1 has been switched to the front-wheel drive mode.

After the control flow illustrated in FIG. 3 is started, the controller 120 may determine whether the front wheels 11a and 11b have slipped in Step S101. If the controller 120 determines that the front wheels 11a and 11b have slipped (Step S101: YES), the controller 120 may cause the process to proceed to Step S102. In Step S102, the controller 120 may switch the drive mode of the vehicle 1 to the four-wheel drive mode to perform the torque adjustment control. In contrast, if the controller 120 determines that the front wheels 11a and 11b have not slipped (Step S101: NO), the controller 120 may end the control flow illustrated in FIG. 3.

In the determination process in Step S101, the controller 120 may specify the slip ratio of the front wheels 11a and 11b, for example. In a case where the slip ratio of the front wheels 11a and 11b is equal to or greater than a reference slip ratio, the controller 120 may determine that the front wheels 11a and 11b have slipped. The controller 120 may specify the slip ratio of the front wheels 11a and 11b on the basis of the results of the detection by the front-wheel motor revolution sensor 21f and the vehicle speed sensor 23. The reference slip ratio may be set so that a slip of any of the drive wheels 11 is appropriately determined. The reference slip ratio may be set as appropriate depending on the specifications of the vehicle 1.

In a case where the drive mode is switched to the four-wheel drive mode in Step S102, the controller 120 performs the torque adjustment control that reduces the driving torque of the front wheels 11a and 11b and adjusts the driving torque of the rear wheels 11c and 11d to equal to or less than the driving torque of the front wheels 11a and 11b, as described above. The torque adjustment control executed in association with the switching to the four-wheel drive mode is described in detail below.

After Step S102, the controller 120 may determine whether the vehicle 1 has entered a high μ road (Step S103). If the controller 120 determines that the vehicle 1 has entered the high μ road (Step S103: YES), the controller 120 may cause the process to proceed to Step S104. In Step S104, the controller 120 may switch the drive mode of the vehicle 1 to the front-wheel drive mode and end the control flow illustrated in FIG. 3. In that case, the torque adjustment control may be stopped in association with the switching to the front-wheel drive mode. In contrast, if the controller 120 determines that the vehicle 1 has not entered the high μ road (Step S103: NO), the controller 120 may repeat the determination process of Step S103.

The high μ road may be a road having a friction coefficient greater than the reference friction coefficient. Unlike the low μ road, the high μ road may be a traveling road on which the drive wheels 11 are unlikely to slip (e.g., a dried, asphalt-paved road), for example.

In the determination process of Step S103, the controller 120 may determine that the vehicle 1 has entered the high μ road in a case where both the slip ratio of the front wheels 11a and 11b and the slip ratio of the rear wheels 11c and 11d are reduced to a value close to 0 (zero) %, for example. The controller 120 may specify the slip ratio of the rear wheels 11c and 11d on the basis of the results of the detection by the rear-wheel motor revolution sensor 21r and the vehicle speed sensor 23.

The determination process in Step S103 should not be limited to the foregoing example in which the slip ratio is used as a parameter for the determination. For example, the controller 120 may determine whether the vehicle 1 has entered the high μ road on the basis of the slip ratio of the front wheels 11a and 11b and various parameters, such as the time rate of change in the slip ratio, the tire grip force, and the time rate of change in the tire grip force, of the rear wheels 11c and 11d.

Now, example transitions of the quantities of states upon switching of the drive mode to the four-wheel drive mode upon a slip of the front wheels 11a and 11b will be described with reference to FIGS. 4 and 5 in comparison between a comparative example and the example embodiment. In the comparative example, the drive mode is switched to the four-wheel drive mode upon the slip of the front wheels 11a and 11b as in the example embodiment. However, unlike the example embodiment, the comparative example does not involve the torque adjustment control while the four-wheel drive mode is executed.

Figure 4:
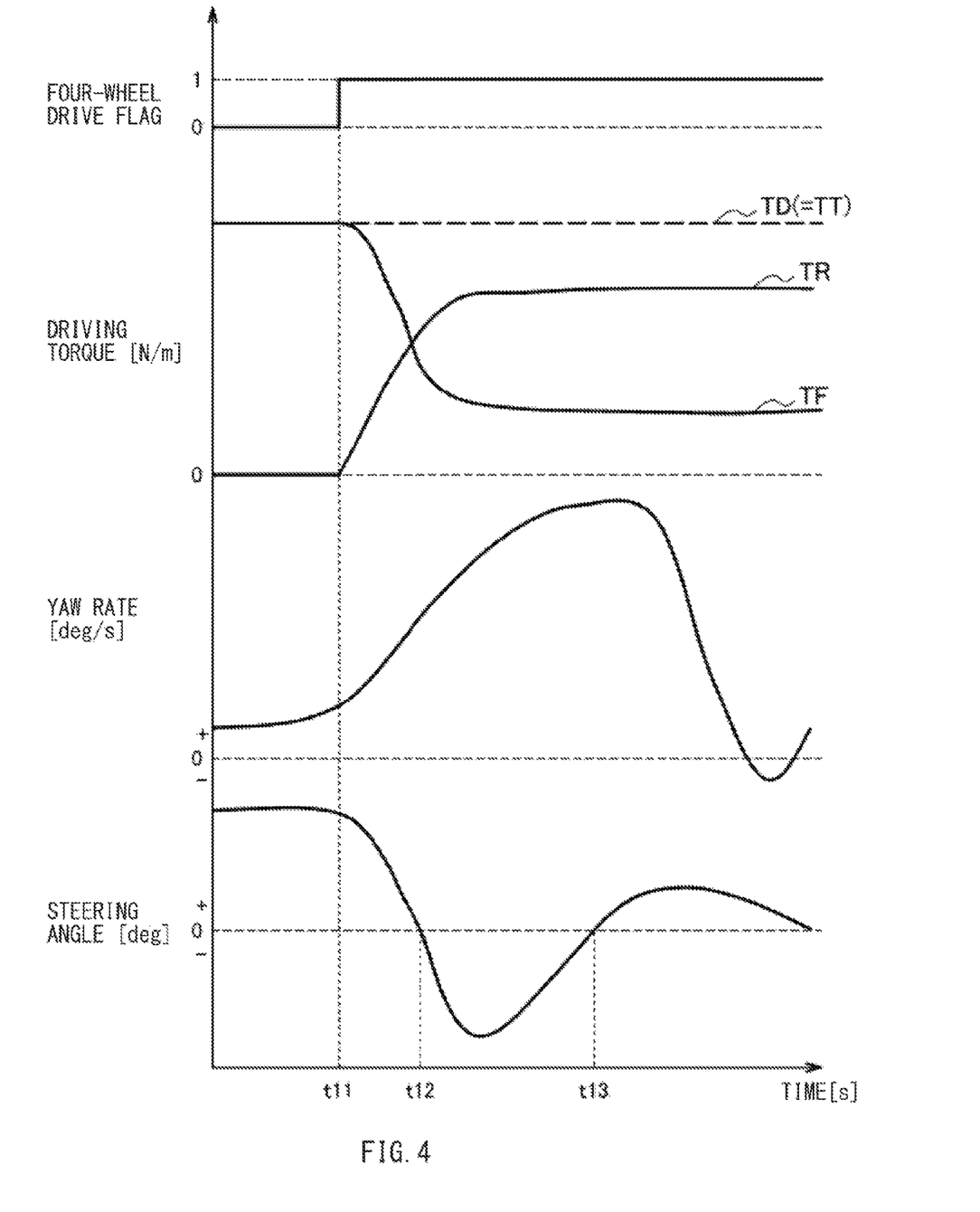
FIG. 4 is a diagram illustrating transitions of the quantities of states upon switching of the drive mode to a four-wheel drive mode upon a slip of the front wheels, according to a comparative example.

FIG. 4 illustrates the transitions of the quantities of states according to the comparative example in a case where the drive mode is switched to the four-wheel drive mode upon a slip of the front wheels 11a and 11b. FIG. 4 illustrates the quantities of states including a four-wheel drive flag, driving torque (e.g., driving torque TF [N/m] of the front wheels 11a and 11b, driving torque TR [N/m] of the rear wheels 11c and 11d, a total torque TT [N/m] corresponding to the sum of the driving torque TF and the driving torque TR, and demanded torque TD [N/m] required to be generated in the vehicle 1), a yaw rate [deg/s] of the vehicle 1, and a steering angle [deg], for example. In the comparative example, the total torque TT is equal to the demanded torque TD.

In FIG. 4, a positive direction of the yaw rate and a positive direction of the steering angle correspond to a direction in which the vehicle 1 turns to the right (e.g., the right side with respect to the vehicle 1 directed in the advancing direction). In contrast, a negative direction of the yaw rate and a negative side of the steering angle correspond to a direction in which the vehicle 1 turns to the left (e.g., the left side with respect to the vehicle directed in the advancing direction). The four-wheel drive flag becomes "1" when the drive mode is switched to the four-wheel drive mode, and becomes "0" when the drive mode is not switched to the four-wheel drive mode (i.e., the drive mode is switched to the front-wheel drive mode). The four-wheel drive flag is rewritten by the control apparatus according to the comparative example and stored.

In the comparative example illustrated in FIG. 4, the vehicle 1 in the front-wheel drive mode turns to the right to enter the low μ road at a time t11, and causes a slip of the front wheels 11a and 11b. Thus, the yaw rate and the steering angle take positive values at and before the time t11. Additionally, the driving torque TF of the front wheels 11a and 11b is identical to the demanded torque TD at and before the time t11. In association with the slip of the front wheels 11a and 11b, the four-wheel drive flag is switched from "0" to "1" to switch the drive mode to the four-wheel drive mode at the time t11.

In the comparative example, the torque is distributed to the front wheels and the rear wheels so that the total torque TT corresponding to the sum of the driving torque TF of the front wheels 11a and 11b and the driving torque TR of the rear wheels 11c and 11d becomes identical to the demanded torque TD in the four-wheel drive mode. That is, the driving torque TF of the front wheels 11a and 11b is reduced, and the amount of reduction in the driving torque TF of the front wheels 11a and 11b is compensated by generating the driving torque TR of the rear wheels 11c and 11d in an amount substantially the same as the amount of reduction in the driving torque TF. Accordingly, the slip of the front wheels 11a and 11b is cancelled by reducing the driving torque TF of the front wheels 11a and 11b at and after the time t11.

However, in the comparative example illustrated in FIG. 4, a slip of the rear wheels 11c and 11d can be caused at or after the time t11 due to the increase in the driving torque TR of the rear wheels 11c and 11d. This can result in an oversteer behavior of the vehicle 1 and an increase in the yaw rate at or after the time t11. This generates the necessity of a steering operation by the driver to make a major correction of the steering angle. For example, the driver has to perform a steering operation to turn the steering wheel in a direction opposite to the turning direction of the vehicle 1, as apparent from the steering angle taking a negative value between a time t12 and a time t13.

Figure 5:
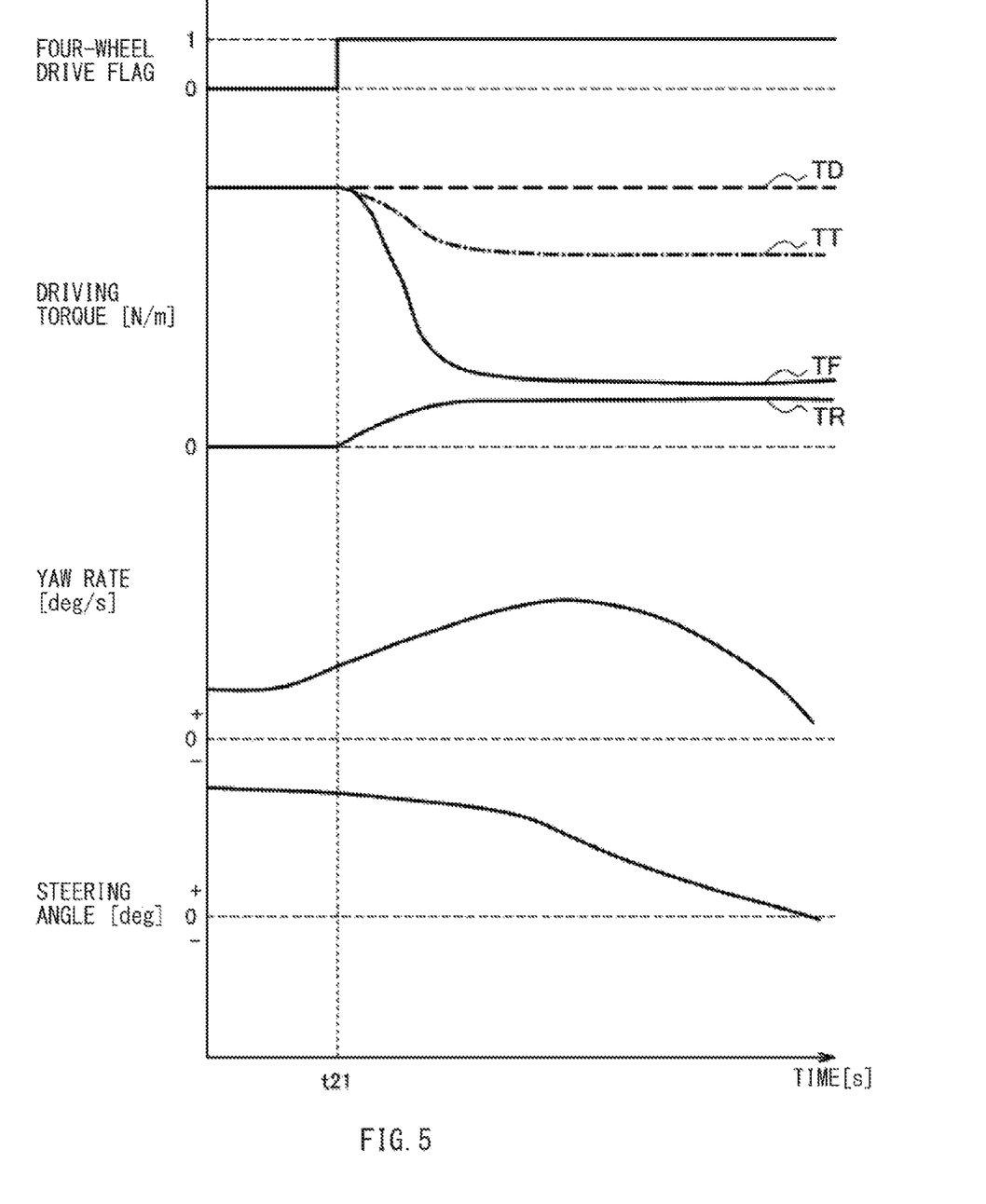
FIG. 5 is a diagram illustrating transitions of the quantities of states upon switching of the drive mode to the four-wheel drive mode upon a slip of the front wheels, according to the example embodiment of the technology.

FIG. 5 illustrates example transitions of the quantities of states according to the example embodiment in a case where the drive mode is switched to the four-wheel drive mode upon a slip of the front wheels 11a and 11b. For example, FIG. 5 illustrates the quantities of the same states as those illustrated in FIG. 4. In the example embodiment, the four-wheel drive flag may be rewritten by the control apparatus 100 and stored.

In the example illustrated in FIG. 5, the vehicle 1 in the front-wheel drive mode may turn to the right to enter the low μ road at a time t21, and cause a slip of the front wheels 11a and 11b, as in the comparative example illustrated in FIG. 4. In association with the slip of the front wheels 11a and 11b, the four-wheel drive flag may be switched from "0" to "1" to switch the drive mode to the four-wheel drive mode at the time t21.

In this example embodiment, the torque adjustment control is executed in the four-wheel drive mode. The torque adjustment control reduces the driving torque TF of the front wheels 11a and 11b and adjusts the driving torque TR of the rear wheels 11c and 11d to equal to or less than the driving torque TF of the front wheels 11a and 11b. Therefore, the slip of the front wheels 11a and 11b is cancelled by reducing the driving torque TF of the front wheels 11a and 11b at and after the time t21.

In the torque adjustment control, the controller 120 may control the driving torque TF of the front wheels 11a and 11b so that the slip ratio of the front wheels 11a and 11b becomes closer to a target slip ratio greater than 0%, for example. The target slip ratio may be set to a value within a range in which the grip force of the front wheels 11a and 11b (i.e., the frictional force generated between the tires and the road) is effectively recovered.

Figure 6:
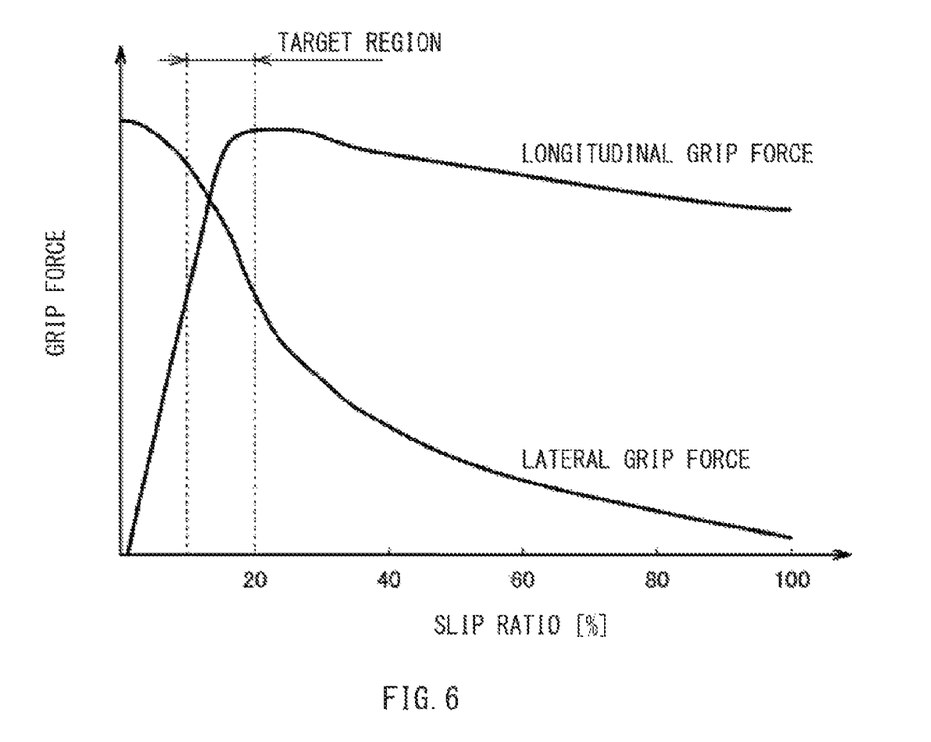
FIG. 6 is a diagram illustrating an example relation between a slip ratio and grip force.

FIG. 6 is a schematic diagram illustrating an example relation between the slip ratio and the grip force. As illustrated in FIG. 6, a longitudinal grip force or a component of the grip force in an advancing direction generally increases with an increase in the slip ratio of the drive wheel 11 from 0% to about 20%, and then decreases with an increase in the slip ratio of the drive wheel 11. Additionally, a lateral grip force or a component of the grip force in a direction perpendicular to the advancing direction generally reduces with an increase in the slip ratio of the drive wheel 11. Thus, the slip ratio of the drive wheel 11 may be controlled within a target range from, for example, about 10% to about 20% to maintain each of the longitudinal grip force and the lateral grip force at a high level. Therefore, in the torque adjustment control, the target slip ratio may be set to a value within the target range in which the grip force of the front wheels 11a and 11b is effectively recovered.

According to the example embodiment, the driving torque TR of the rear wheels 11c and 11d is adjusted to be equal to or less than the driving torque TF of the front wheels 11a and 11b by the torque adjustment control. This curbs an excessive increase in the driving torque TR of the rear wheels 11c and 11d in association with switching to the four-wheel drive mode. Therefore, in the example illustrated in FIG. 5, the slip of the rear wheels 11c and 11d is curbed or prevented at or after the time t21. This curbs an oversteer behavior of the vehicle at and after the time t21 and thus stabilizes the vehicle behavior. Accordingly, an increase in the yaw rate is curbed, and the necessity of the steering operation to make a major correction of the steering angle is reduced or eliminated, compared with the comparative example illustrated in FIG. 4. For example, the driver does not have to perform a steering operation to turn the steering wheel in a direction opposite to the turning direction of the vehicle 1, as apparent from the steering angle kept at a positive value at and after the time t21.

In the torque adjustment control, the controller 120 may control the driving torque TR of the rear wheels 11c and 11d so that the slip ratio of the rear wheels 11c and 11d becomes closer to 0%, for example, to prevent or curb a slip of the rear wheels 11c and 11d as appropriate. For example, the controller 120 may control the driving torque TR of the rear wheels 11c and 11d in the torque adjustment control so that the following Expression 1 is satisfied.

$$TR=TF/(1+ST/100) \quad \text{Expression 1}$$

In Expression 1, ST denotes the target slip ratio of the front wheels 11a and 11b in the torque adjustment control. In a case where the target slip ratio ST is 10%, for example, the driving torque TR of the rear wheels 11c and 11d may be a value obtained by dividing the driving torque TF of the front wheels 11a and 11b with 1.1. Controlling the driving torque TR of the rear wheels 11c and 11d so that Expression 1 is satisfied allows the slip ratio of the rear wheels 11c and 11d to become closer to 0% as appropriate.

Note that, in the example illustrated in FIG. 5, the total torque TT falls below the demanded torque TD at and after the time t21 as a result of the execution of the torque adjustment control. However, the total torque TT may be identical to the demanded torque TD while the torque adjustment control is executed. For example, in a case where the driving torque TF of the front wheels 11a and 11b is determined so that the slip ratio of the front wheels 11a and 11b becomes the target slip ratio ST in the torque adjustment control, and where a value obtained by subtracting the determined driving torque TF from the demanded torque TD is less than the driving torque TR of the rear wheels 11c and 11d determined by Expression 1, setting the driving torque TR to the value determined by Expression 1 may cause the total torque TT to exceed the demanded torque TD. Therefore, in such a case, the controller 120 may set the driving torque TR to the value obtained by subtracting the driving torque TF from the demanded torque TD. This allows the total torque TT to become identical to the demanded torque TD. The demanded torque may be determined by the controller 120 on the basis of the accelerator operation amount and the vehicle speed, for example.

[Effects of Control Apparatus]

Some effects of the control apparatus 100 according to an example embodiment of the technology will now be described.

Upon a slip of the front wheels 11a and 11b of the vehicle 1, the controller 120 in the control apparatus according to the example embodiment executes the torque adjustment control that reduces the driving torque TF of the front wheels 11a and 11b and adjusts the driving torque TR of the rear wheels 11c and 11d to equal to or less than the driving torque TF of the front wheels 11a and 11b. Thus, upon a slip of the front wheels 11a and 11b, the driving torque TF of the front wheels 11a and 11b is reduced to cancel the slip of the front wheels 11a and 11b. Further, an excessive increase in the driving torque TR of the rear wheels 11c and 11d is curbed by adjusting the driving torque TR of the rear wheels 11c and 11d to equal to or less than the driving torque TF of the front wheels 11a and 11b. This curbs or prevents a slip of the rear wheels 11c and 11d and, in turn, an oversteer behavior of the vehicle. Accordingly, it is possible to stabilize a vehicle behavior.

Further, the controller 120 in the control apparatus 100 according to the embodiment may be configured to switch the drive mode of the vehicle 1 between the front-wheel drive mode in which the front wheels 11a and 11b are driven whereas the rear wheels 11c and 11d are not driven and the four-wheel drive mode in which the front wheels 11a and 11b and the rear wheels 11c and 11d are driven. For example, if the front wheels 11a and 11b slip while the front-wheel drive mode is executed, the controller 120 may switch the drive mode to the four-wheel drive mode to execute the torque adjustment control. In a normal condition, the controller 120 may switch the drive mode to the front-wheel drive mode to reduce electric power consumption. In contrast, if the front wheels 11a and 11b slip, the controller 120 may switch the drive mode to the four-wheel drive mode to stabilize the vehicle behavior.

Further, the controller 120 in the control apparatus 100 according to the example embodiment may control the driving torque TF of the front wheels 11a and 11b so that the slip ratio of the front wheels 11a and 11b becomes closer to the target slip ratio greater than 0% in the torque adjustment control. This allows the grip force of the front wheels 11a and 11b to be effectively recovered after the slip. For example, the longitudinal grip force and the lateral grip force of the tires of the front wheels 11a and 11b are each maintained at a high level.

Further, the controller 120 in the control apparatus 100 according to the example embodiment may control the driving torque TR of the rear wheels 11c and 11d so that the slip ratio of the rear wheels 11c and 11d becomes closer to 0% in the torque adjustment control. This prevents or curbs a slip of the rear wheels 11c and 11d as appropriate.

Further, the controller 120 in the control apparatus 100 according to the example embodiment may control the driving torque TR of the rear wheels 11c and 11d so that Expression 1, TR=TF/(1+ST/100) is satisfied. This allows the slip ratio of the rear wheels 11c and 11d to become closer to 0% as appropriate.

In a case where the vehicle 1 enters a high μ road having a high friction coefficient while the torque adjustment control is executed, the controller 120 in the control apparatus 100 according to the example embodiment may stop the torque adjustment control. This helps to prevent unnecessary execution of the torque adjustment control in a condition where the drive wheels 11 are unlikely to slip and thus there is no necessity for the torque adjustment control.

Some embodiments of the technology are described in detail above with reference to the accompanying drawings. It should be appreciated that the embodiments of the technology described above are mere examples and are not intended to limit the scope of the technology. It should be also appreciated that various omissions, replacements, and modifications may be made in the foregoing embodiments described herein, without departing from the scope of the technology. The technology is intended to include such modifications and alterations in so far as they fall within the scope of the appended claims or the equivalents thereof.

Although one example configuration of the vehicle 1 is described above with reference to FIG. 1, for example, the configuration of the vehicle according to an example embodiment of the technology should not be limited thereto. According to another example embodiment of the technology, the vehicle may be the vehicle 1 illustrated in FIG. 1 to which some components are added, of which configuration is modified, or from which some components are removed. According to still another example embodiment of the technology, the vehicle may include drive motors for the respective drive wheels. For example, the vehicle may include four drive motors. According to yet another example embodiment of the technology, a portion or the entirety of the drive source of the vehicle may be a drive source other than the drive motor, such as an engine.

For example, some of the steps of the process described herein with reference to the flowchart are not necessarily executed in the order indicated by the flowchart. Optional steps may be added in the process or some of the steps of the process may be omitted.

The controller 120 in the control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 120 in the control apparatus 100 illustrated in FIG. 2.

The invention claimed is:

1. A control apparatus comprising
a controller configured to execute torque adjustment control that reduces a driving torque of a front wheel of a vehicle and adjusts a driving torque of a rear wheel of the vehicle to equal to or less than the driving torque of the front wheel and greater than zero, upon a slip of the front wheel of the vehicle,
wherein
the controller is configured to
switch a drive mode of the vehicle between a first drive mode in which the front wheel is driven whereas the rear wheel is not driven and a second drive mode in which the front wheel and the rear wheel are driven, and
switch the drive mode to the second drive mode to execute the torque adjustment control if the front wheel slips while the first drive mode is executed.

2. The control apparatus according to claim 1, wherein the controller is configured to control the driving torque of the front wheel to cause a slip ratio of the front wheel to become closer to a target slip ratio in the torque adjustment control, the target slip ratio being greater than 0%.

3. The control apparatus according to claim 2, wherein the controller is configured to control the driving torque of the rear wheel to cause a slip ratio of the rear wheel to become closer to 0% in the torque adjustment control.

4. The control apparatus according to claim 3, wherein the controller is configured to control the driving torque of the rear wheel to satisfy the following Expression 1 in the torque adjustment control:

$$TR=TF/(1+ST/100) \qquad \text{Expression 1}$$

where TF denotes the driving torque [N/m] of the front wheel, TR denotes the driving torque [N/m] of the rear wheel, and ST denotes the target slip ratio [%].

5. The control apparatus according to claim 4, wherein the controller is configured to stop the torque adjustment control in a case where the vehicle enters a high μ road while the torque adjustment control is executed, the high μ road having a high friction coefficient greater than a reference friction coefficient.

6. The control apparatus according to claim 2, wherein the controller is configured to stop the torque adjustment control in a case where the vehicle enters a high μ road while the torque adjustment control is executed, the high μ road having a high friction coefficient greater than a reference friction coefficient.

7. The control apparatus according to claim 2, wherein the controller is configured to stop the torque adjustment control in a case where the vehicle enters a high μ road while the torque adjustment control is executed, the high μ road having a high friction coefficient greater than a reference friction coefficient.

8. The control apparatus according to claim 1, wherein the controller is configured to control the driving torque of the front wheel to cause a slip ratio of the front wheel to become closer to a target slip ratio in the torque adjustment control,
wherein the controller includes a motor controller to control the driving torque of the front wheels and the driving torque of the rear wheels in a separate manner.

9. The control apparatus according to claim 8, wherein the controller is configured to control the driving torque of the rear wheel to cause a slip ratio of the rear wheel to become closer to 0% in the torque adjustment control.

10. The control apparatus according to claim 9, wherein the controller is configured to control the driving torque of the rear wheel to satisfy the following Expression 1 in the torque adjustment control:

$$TR=TF/(1+ST/100) \qquad \text{Expression 1}$$

where TF denotes the driving torque [N/m] of the front wheel, TR denotes the driving torque [N/m] of the rear wheel, and ST denotes the target slip ratio [%].

11. The control apparatus according to claim 10, wherein the controller is configured to stop the torque adjustment control in a case where the vehicle enters a high μ road while the torque adjustment control is executed, the high μ road having a high friction coefficient greater than a reference friction coefficient.

12. The control apparatus according to claim 9, wherein the controller is configured to stop the torque adjustment control in a case where the vehicle enters a high μ road while the torque adjustment control is executed, the high μ road having a high friction coefficient greater than a reference friction coefficient.

13. The control apparatus according to claim 8, wherein the controller is configured to stop the torque adjustment control in a case where the vehicle enters a high μ road while the torque adjustment control is executed, the high μ road having a high friction coefficient greater than a reference friction coefficient.

14. The control apparatus according to claim 1, wherein the controller is configured to stop the torque adjustment control in a case where the vehicle enters a high μ road while the torque adjustment control is executed, the high μ road having a high friction coefficient greater than a reference friction coefficient.

15. The control apparatus according to claim 1, wherein the controller includes a motor controller to control the driving torque of the front wheels and the driving torque of the rear wheels in a separate manner.

16. A control apparatus comprising
circuitry configured to execute torque adjustment control that reduces a driving torque of a front wheel of a vehicle and adjusts a driving torque of a rear wheel of the vehicle to equal to or less than the driving torque of the front wheel and greater than zero, upon a slip of the front wheel of the vehicle,
wherein
the circuitry is configured to
switch a drive mode of the vehicle between a first drive mode in which the front wheel is driven whereas the rear wheel is not driven and a second drive mode in which the front wheel and the rear wheel are driven, and
switch the drive mode to the second drive mode to execute the torque adjustment control if the front wheel slips while the first drive mode is executed.

17. The control apparatus according to claim 16, wherein the circuitry is configured to control the driving torque of the front wheels and the driving torque of the rear wheels in a separate manner.

18. The control apparatus according to claim 16, wherein
the circuitry is configured to stop the torque adjustment control in a case where the vehicle enters a high μ road while the torque adjustment control is executed, the high μ road having a high friction coefficient greater than a reference friction coefficient,
the circuitry is configured to control the driving torque of the front wheel to cause a slip ratio of the front wheel to become closer to a target slip ratio in the torque adjustment control, the target slip ratio being greater than 0%.

19. The control apparatus according to claim 18, wherein
the circuitry is configured to control the driving torque of the rear wheel to cause a slip ratio of the rear wheel to become closer to 0% in the torque adjustment control.

20. A control apparatus comprising
a controller configured to execute torque adjustment control that reduces a driving torque of a front wheel of a vehicle and adjusts a driving torque of a rear wheel of the vehicle to equal to or less than the driving torque of the front wheel upon a slip of the front wheel of the vehicle,
wherein
the controller is configured to
switch a drive mode of the vehicle between a first drive mode in which the front wheel is driven whereas the rear wheel is not driven and a second drive mode in which the front wheel, and the rear wheel are driven, and
switch the drive mode to the second drive mode to execute the torque adjustment control if the front wheel slips while the first drive mode is executed,
wherein the torque adjustment control is executed only in association with the switching to the second mode and upon the slip of the front wheel of the vehicle in the first mode.

* * * * *